United States Patent
Cote et al.

(10) Patent No.: US 7,294,259 B2
(45) Date of Patent: Nov. 13, 2007

(54) MEMBRANE MODULE FOR GAS TRANSFER

(75) Inventors: Pierre Lucien Cote, Dundas (CA); Hidayat Husain, Brampton (CA); Ian Glenn Towe, Caledon Village (CA)

(73) Assignee: Zenon Technology Partnership, Wilmington, DE (US)

( * ) Notice: Subject to any disclaimer, the term of this patent is extended or adjusted under 35 U.S.C. 154(b) by 413 days.

(21) Appl. No.: 10/895,959

(22) Filed: Jul. 22, 2004

(65) Prior Publication Data

US 2005/0054087 A1    Mar. 10, 2005

Related U.S. Application Data

(63) Continuation-in-part of application No. 10/801,660, filed on Mar. 17, 2004, now Pat. No. 7,169,295, which is a continuation of application No. PCT/CA2004/000206, filed on Feb. 13, 2004, and a continuation-in-part of application No. 10/777,204, filed on Feb. 13, 2004, now Pat. No. 7,118,672, and a continuation-in-part of application No. PCT/CA2004/000206, filed on Feb. 13, 2004.

(60) Provisional application No. 60/496,178, filed on Aug. 18, 2003, provisional application No. 60/447,025, filed on Feb. 13, 2003.

(30) Foreign Application Priority Data

Aug. 22, 2003 (CA) ................... 2438050
Aug. 22, 2003 (CA) ................... 2438101
Aug. 22, 2003 (CA) ................... 2438432
Aug. 22, 2003 (CA) ................... 2438441
Aug. 22, 2003 (CA) ................... 2438444

(51) Int. Cl.
*C02F 3/00*    (2006.01)

(52) U.S. Cl. ....................... 210/220
(58) Field of Classification Search ........ 210/620–628, 210/220
See application file for complete search history.

(56) References Cited

U.S. PATENT DOCUMENTS 2,458,163 A    1/1949    Hays (Continued)

FOREIGN PATENT DOCUMENTS

CA    1096976    3/1961

(Continued)

OTHER PUBLICATIONS

Dr. Michael J. Semmens and Denise Hanus, "Studies of a Membrane Aerated Bioreactor for Wastewater Treatment", Cranfield University, Jun. 1999.

(Continued)

*Primary Examiner*—Chester T. Barry
(74) *Attorney, Agent, or Firm*—Bereskin & Parr

(57) ABSTRACT

A membrane module apparatus to transfer a gas to or from a liquid has a sheet having at least one gas transfer surface. The gas transfer surface is in flow communication with a header through a gas channel. The module may be used to support a biofilm on the gas transfer surface. A plurality of sheets or portions of sheets may be separated by spacers.

10 Claims, 17 Drawing Sheets

U.S. PATENT DOCUMENTS

| | | | |
|---|---|---|---|
| 4,126,544 A | 11/1978 | Baensch et al. | |
| 4,181,604 A | 1/1980 | Onishi et al. | |
| 4,328,102 A | 5/1982 | Bellhouse et al. | |
| 4,416,993 A | 11/1983 | McKeown | |
| 4,664,681 A | 5/1987 | Anazawa et al. | |
| 4,746,435 A | 5/1988 | Onishi et al. | |
| 4,883,594 A | 11/1989 | Sekoulov et al. | |
| 5,015,421 A | 5/1991 | Messner | |
| 5,034,164 A | 7/1991 | Semmens | |
| 5,116,506 A | 5/1992 | Williamson et al. | |
| 5,126,050 A | 6/1992 | Irvine et al. | |
| 5,149,649 A | 9/1992 | Miyamori et al. | |
| 5,238,562 A | 8/1993 | Rogut | |
| 5,482,859 A | 1/1996 | Biller | |
| 5,486,475 A | 1/1996 | Kramer et al. | |
| 5,518,620 A | 5/1996 | Eguchi et al. | |
| 5,520,812 A | 5/1996 | Ryhiner et al. | |
| 5,543,039 A | 8/1996 | Odegaard | |
| 5,716,689 A | 2/1998 | Rogut | |
| 5,945,002 A | 8/1999 | Leukes et al. | |
| 6,001,585 A | 12/1999 | Gramer | |
| 6,013,511 A | 1/2000 | Diels et al. | |
| 6,183,643 B1 | 2/2001 | Goodley | |
| 6,209,855 B1 | 4/2001 | Glassford | |
| 6,214,226 B1* | 4/2001 | Kobayashi et al. | 210/500.23 |
| 6,241,867 B1 | 6/2001 | Mir | |
| 6,309,550 B1 | 10/2001 | Iversen et al. | |
| 6,354,444 B1 | 3/2002 | Mahendran et al. | |
| 6,361,695 B1 | 3/2002 | Husain et al. | |
| 6,387,262 B1 | 5/2002 | Rittmann et al. | |
| 6,531,062 B1 | 3/2003 | Whitehill | |
| 6,558,549 B2 | 5/2003 | Cote et al. | |
| 6,592,759 B2 | 7/2003 | Rable et al. | |
| 6,686,832 B2 | 2/2004 | Mahendran et al. | |
| 2001/0037967 A1 | 11/2001 | Rabie et al. | |
| 2002/0020666 A1 | 2/2002 | Cote et al. | |
| 2003/0104192 A1 | 6/2003 | Hester et al. | |
| 2004/0115782 A1 | 6/2004 | Paterek | |

FOREIGN PATENT DOCUMENTS

| | | |
|---|---|---|
| CA | 2005959 | 8/1990 |
| CA | 2100002 | 2/1994 |
| CA | 2102156 | 7/1994 |
| CA | 2182915 | 2/1997 |
| CA | 2356316 | 8/2000 |
| CA | 2300719 | 9/2001 |
| DE | 3544382 | 6/1987 |
| DE | 4440464 | 6/1996 |
| EP | 0 049 954 | 4/1982 |
| JP | 54-21057 | 2/1979 |
| WO | WO87/03615 | 8/1987 |

OTHER PUBLICATIONS

Brindle et al., Nitrification and Oxygen Utilisation in a Membrane Aeration Bioreactor, Journal of Membrane Science, 1998.

Cote et al., "Bubble-free Aeration Using Membranes: Process Analysis", Journal Water Pollution Control Federation, Nov. 1998.

Cote et al., "Bubble-free Aeration Using Membranes: Mass Transfer Analysis", Journal of Membrane Science, 1989.

Yeh, Show-Jong and Charles R. Jenkins, "Pure Oxygen Fixed Film Reactor", Journal of the Environmental Engineering Division, Aug. 1978, pp. 611-623.

Woolard, C.R., "The Advantages of periodically Operated Biofilm Reactors for the Treatment of Highly Variable Wastewater", Wat. Sci. Tech. vol. 35, No. 1. pp. 199-206. 1997.

Twarowska-Schmidt, Krystyna and Andrzej Wlochowicz, "Melt-spun Asymmetric Poly(4-methyl-1-pentene) Hollow Fibre Membranes", Journal of Membrane Science 137 (1997) 55-61.

Yamagiwa et al., "Simultaneous Organic Carbon Removal and Nitrification by Biofilm Formed on Oxygen Enrichment Membrane". Journal of Chemical Engineering of Japan, 27(1994) October 638-643.

Casey et al., "Review of Membrane Aerated Biofilm Reactors", Resources, Conservation and Recycling 27 (1999) 203-215.

* cited by examiner

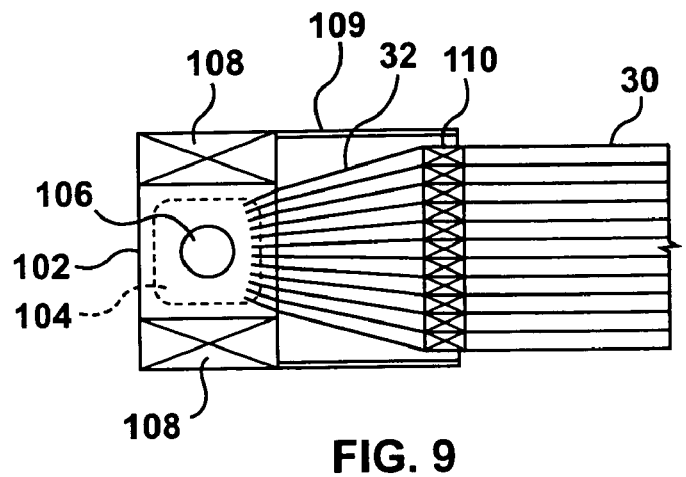
FIG. 9
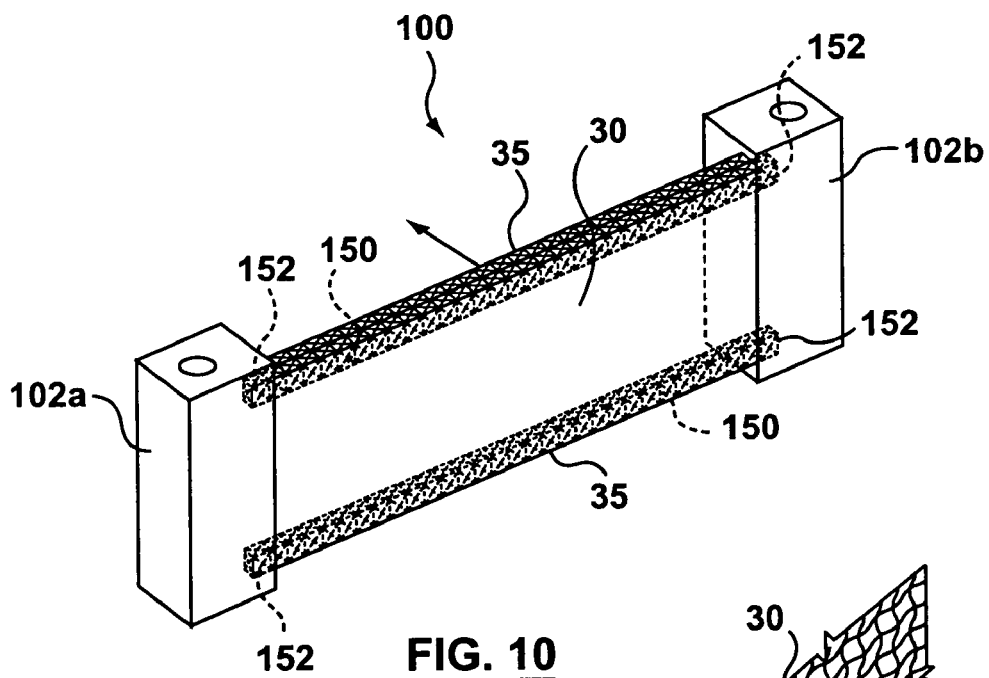
FIG. 10
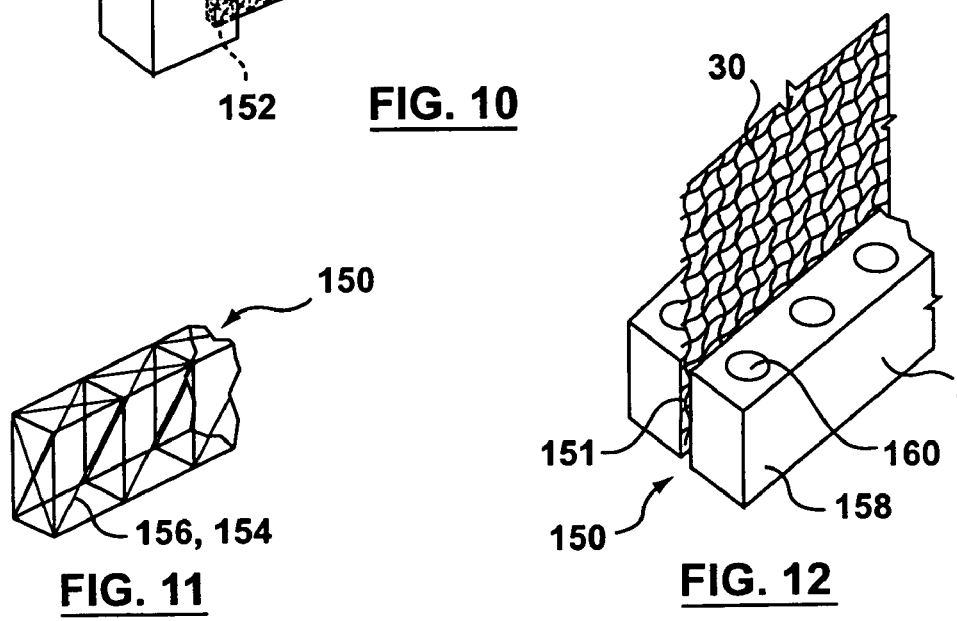
FIG. 11
FIG. 12

MEMBRANE MODULE FOR GAS TRANSFER

This application is (1) a continuation-in-part of U.S. Ser. No. 10/801,660 filed Mar. 17, 2004 now U.S. Pat. No. 7,169,295 which is (i) a continuation-in-part of U.S. Ser. No. 10/777,204 filed Feb. 13, 2004 now U.S. Pat. No. 7,118,672 which is an application claiming the benefit under 35 USC 119(e) of U.S. Provisional Patent Application Ser. No. 60/447,025 filed Feb. 13, 2003 (ii) an application claiming the benefit under 35 USC 119(e) of U.S. Provisional Patent Application Ser. No. 60/496,178 filed Aug. 18, 2003; and (iii) a continuation of PCT Application Ser. No. PCT/CA2004/000206, filed Feb. 13, 2004 (2) an application claiming the benefit under 35 USC 119(e) of U.S. Provisional Application Ser. No. 60/496,178 filed Aug. 18, 2003; and (3) a continuation-in-part of PCT Application Ser. No. PCT/CA2004/000206, filed Feb. 13, 2004. This application also claims priority from Canadian Patent Application Nos. 2,438,444; 2,438,441; 2,438,432; 2,438,050; and, 2,438,101 all filed Aug. 22, 2003. All of the applications listed above are incorporated herein in full by this reference to them.

FIELD OF THE INVENTION

This invention relates to membrane modules to transfer a gas to or from another gas or a liquid for purposes, for example, such as waste water treatment.

BACKGROUND OF THE INVENTION

Recently, development work has been done on a membrane supported bioreactor concept. For example, U.S. Pat. Nos. 4,181,604 and 4,746,435 describe a process for treating wastewater by supplying oxygen from one side of a gas-permeable membrane to micro-organisms growing on the other side of the membrane. Hollow fibers with porous walls were used as the membrane. In U.S. Pat. No. 5,116,506, a gas permeable membrane divides a reactor vessel into a liquid compartment and a gas compartment. A biofilm is grown on the gas permeable membrane on the liquid side of the membrane. Oxygen and alternate gases pass through the membrane to the bacteria growing on the liquid side of the membrane.

SUMMARY OF THE INVENTION

It is an object of the invention to improve on the prior art. It is another object of the present invention to provide a membrane module to transfer a gas to or from another gas or a liquid. The following summary provides an introduction to the invention which may reside in a combination or sub-combination of features provided in this summary or in other parts of this document.

According to one aspect of the present invention, membrane modules of various configurations are described. The modules generally include one or more membranes in a planar or sheet form having an inlet for gas at one edge and/or an outlet for gas at another edge. The planar or sheet form may be a continuous surface or a fabric or other structure made up of hollow fibers. The planar or sheet form has a gas transfer surface. A gas channel is connected in flow communication between the gas transfer surface and the inlet or outlet.

In the various embodiments, headers are attached to one or both of these edges to from modules of various configurations. In some embodiments, the modules are further assembled into cassettes. Within a cassette, the planar or sheet forms may be separated by spaces of various configurations. The modules are adapted to support a biofilm on the membrane surface but some or all of the embodiments may also be used for other purposes.

BRIEF DESCRIPTION OF THE DRAWINGS

For a better understanding of the present invention and to show more clearly how it may be carried into effect, reference will now be made by way of example, to the accompanying drawings that show embodiments of the present invention, and in which:

FIG. 9 is cross-sectional view of a portion of the module of FIG. 6 taken along the lines 9-9;

FIG. 10 is a perspective view of the module of FIG. 6 having alternative spacing structure;

FIG. 11 is a detailed perspective view of a portion of the spacing structure of FIG. 10;

FIG. 12 is a perspective view of an alternative spacing structure to that of FIG. 11;

DETAILED DESCRIPTION OF THE INVENTION

Figure 1:
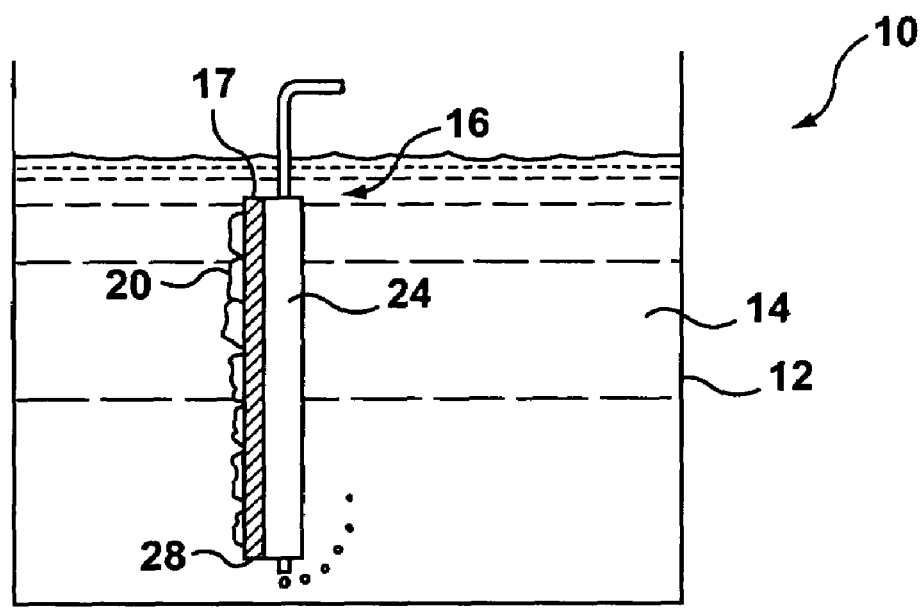
FIG. 1 is a front view of one embodiment of a bioreactor apparatus according to the present invention.
Figure 2:
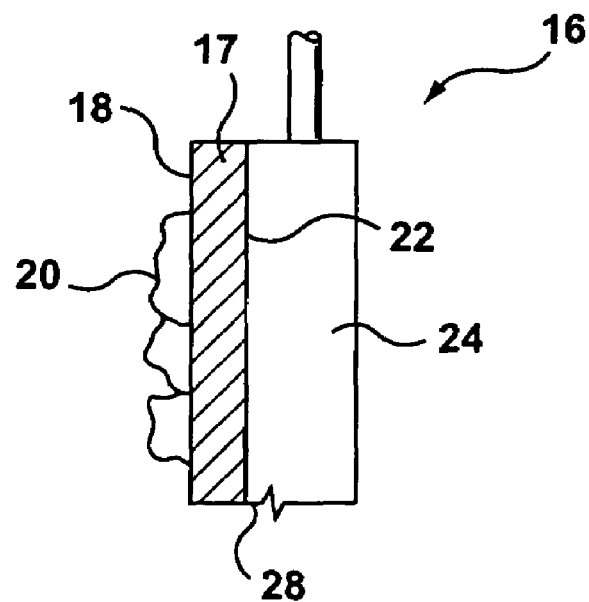
FIG. 2 is an enlarged detailed view of a portion of the apparatus of FIG. 1.

A bioreactor having a membrane supported biofilm according to the present invention is shown generally at reference character 10 in FIG. 1 and FIG. 2. The bioreactor 10 has a tank 12 containing tank water 14. A biomass or biofilm growth support element 16 is provided in the tank water 14, having a gas permeable membrane portion 17 with a support surface 18 on which microorganisms or biomass 20 can grow.

The membrane portion 17 of the biomass growth support element 16 has a gas interface surface 22 provided opposite the support surface 18. The gas interface surface 22 is open to an air channel 24 with which the growth support element 16 is provided. Gas, such as oxygen or components of air, can diffuse through the membrane portion 17 of the growth support element 16 from the air channel 24 to the support surface 18, and thereby supply oxygen to the biomass 20. Excess gases, if any, may be released to the tank water 14 or ducted back to the atmosphere. The biomass growth support element 16 may optionally have two or more support surfaces 18 and support a biomass 20 on both sides, rather than only on one side as shown.

The growth support elements 16 can be provided in the form of sheets 28, each sheet 28 providing one or more membrane portions 17 with support surfaces 18 and air channels 24.

Figure 3:
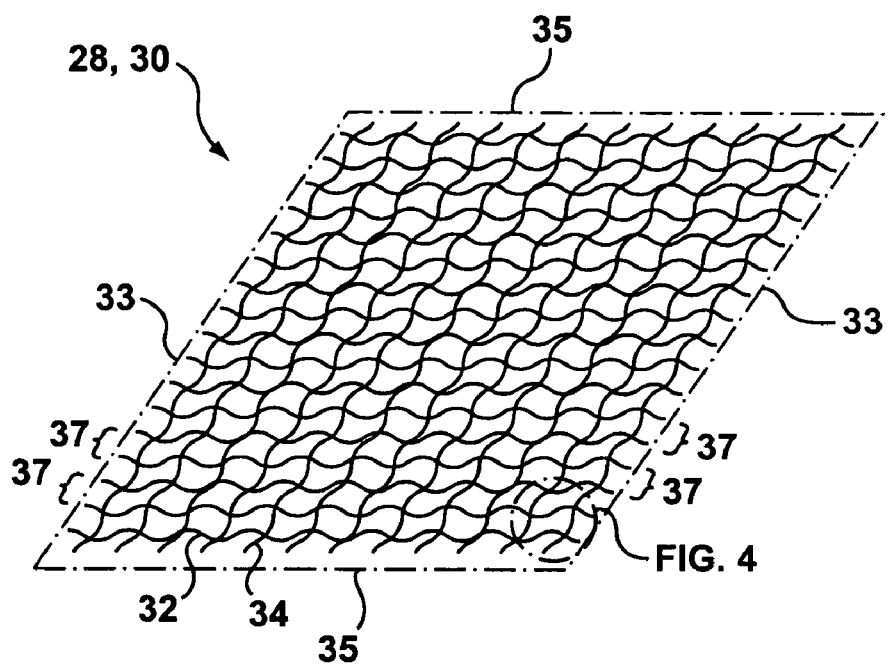
FIG. 3 is a perspective view of one embodiment of a growth support sheet according to the present invention.

Referring now to FIG. 3, the sheets 28 can be in the form of a textile sheet 30, constructed of, for example, but not limited to, a set of hollow fibers 32 extending in one direction, and a set of inert fibers 34 extending in a direction transverse to the first set. The sheet 30 may support a layer of biomass 20 on two sides. The sheet 30 has opposed active edges 33 defined by open ends of the hollow fibers 32, and inert edges 35 extending between the active edges 33. Inert edges 35 may have inert fibres 34 folded back to make the adjacent inert fibre 34 or may be confined by a strip of hot melt glue, a hem, or additional lines of stitching or mechanical clips to prevent fraying or unraveling. In making the sheet 30, it can be that two or more adjacent hollow fibers 32 are formed of a single continuous fiber that is folded back on itself at a fold portion 37. The fold portion 37 of the hollow fibers 32 can be severed or punctured to generate the active edges 33. Optionally, the sheet 30 may have hollow fibers 32 running in both directions such that all four of its edges are active edges 33.

Figure 4:
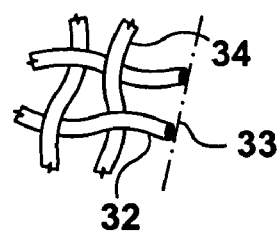
FIG. 4 is a detailed view of a portion of the sheet of FIG. 3.

The inert fibers 34 can be interconnected with the hollow fibers 32 by means of, for example, but not limited to, various types of knitting, stitching, or weaving so that a cohesive textile sheet 30 is provided. In the embodiment illustrated, the hollow fibers 32 and inert fibers 34 are interconnected by weaving, as best seen in FIG. 4. The fibers 32, 34 are generally parallel and extend directly between the edges 33, 35, but other configurations may also be used.

Figure 5:
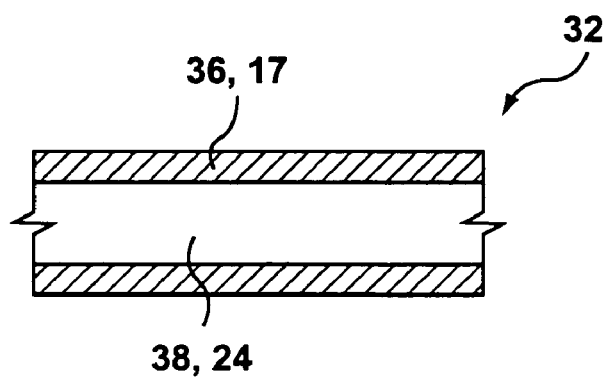
FIG. 5 is an enlarged cross-sectional view of a fiber of the sheet of FIG. 3.

As best seen in FIG. 5, the hollow fibers 32 have tubular walls 36 that provide the sheet 30 with membrane portions 17. The interior of each hollow fiber 32 defines a lumen 38 that provides the air channel 24 for the sheet 30. The hollow fibers 32 can be made from polymethyl pentene (PMP), which has a high diffusion coefficient for oxygen. The PMP fibers may have dense but gas permeable walls. The hollow fibers 32 may also be made of other substances such as silicone or polyolefins such as PE or PP, also having dense walls or a dense layer, or from hydrophobic materials such as chemically treated PP or PE which has been stretched to create microporous walls, or other substances which are permeable to gases but non-welting and impermeable to liquid water. A sheet construction is described in U.S. Provisional Patent Application Ser. No. 60/447,025, filed on Feb. 13, 2003. The entire text of 60/447,025 is incorporated herein by this reference to it. Sheets 30 can also be planar structures such as those shown in U.S. Pat. No. 6,558,549. The entire text of U.S. Pat. No. 6,558,549 is incorporated herein by this reference to it The sheets 28, 30 can be configured in modules, each module providing a header to supply air or other gas to the gas channels 24. The modules can have more than one sheet 28, 30. The sheets 28, 30 in a module can be of a generally flat, planar configuration, or can be in other configurations, such as, for example, but not limited to, spiral configurations.

Figure 6:
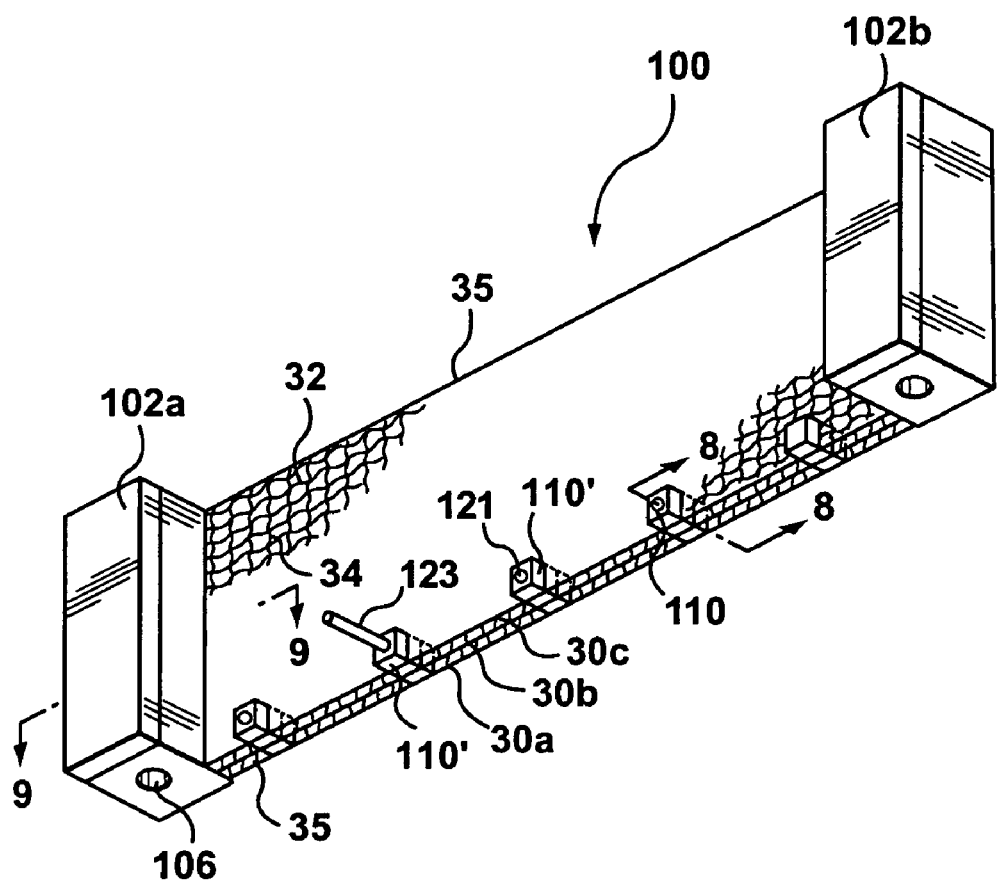
FIG. 6 is one embodiment of a membrane module for the apparatus of FIG. 1.

Referring now to FIG. 6, a first embodiment of a module constructed of the sheet 30 is shown at 100. The module 100 has a plurality of sheets 30 extending between two parallel headers 102a and 102b. In FIG. 6, the module 100 is designed to have about 12 sheets 30, three of which have been illustrated and identified as sheets 30a, 30b, and 30c. The headers 102 may be oriented generally vertically when installed in the tank 12. The header 102a is a gas delivery header, and the header 102b is a gas exhaust header. In some embodiments, the gas exhaust header 102b may be replaced by a dead end header holding one set of ends of the hollow fibers 32 closed or the gas exhaust header 102b may be omitted with one set of ends of the hollow fibers 32 optionally loose or positionally restrained and either closed or open.

Figure 7:
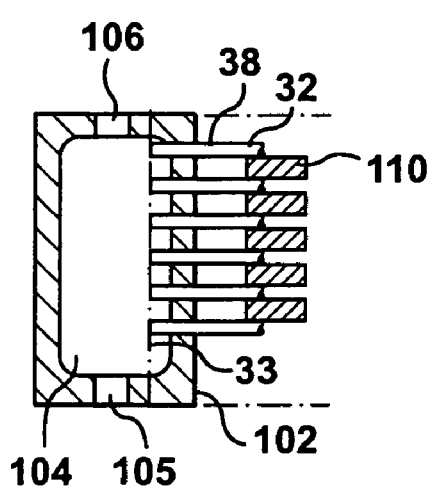
FIG. 7 is a cross sectional view of a portion of the module of FIG. 6.

The sheets 30 are oriented such that the hollow fibers 32 extend between the headers 102. In this configuration, the hollow fibers 32 may be oriented generally horizontally in use, although they may not follow a straight line across the horizon depending on the method used to make the fabric. The inert fibers 34 may be oriented generally vertically when the module 100 is installed in the tank 12. As best seen in FIG. 7, the headers 102 each have an have internal chamber 104, and the ends of the fibers 32 (defining the active edge 33) are potted in the headers 102 so that the lumens 38 of the fibers 32 are in flow communication with the chambers 104 of the headers 102. Ports 106 can be provided in the headers 102, extending through the housing of the headers 102 to the chambers 104.

Figure 8:
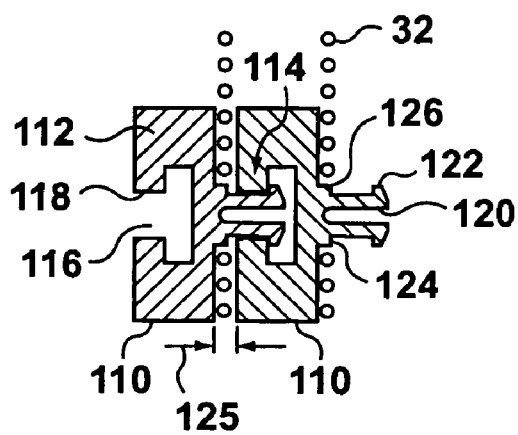
FIG. 8 is a cross-sectional view of a portion of the module of FIG. 6 taken along the lines 8-8.

Spacers 110 may be provided between adjacent sheets 30 in the module 100. As best seen in FIG. 8, in the embodiment illustrated, each spacer 110 has a base portion 112 that is generally square-shaped with connection means 114 extending from either side of the base 112 so that adjacent spacers 110 can be connected together in a snap-fit arrangement. The connection means 114 can comprise a recess 116 with a retaining lip 118 on one side of the base portion 112, and axially extending fingers 120 with transverse protrusions 122 on the other side of the base portion 112, to engage the lip 118. Alternately spacers 110 may be made of simple blocks or buttons glued to the sheets 30. As a further alternate embodiment, spacers 110' can be provided having a central through-hole 12' through which a retaining rod 123 can be inserted (see FIG. 6). The ends of the rod 123 can be bent or capped to hold a set of adjacent spacers 10' together. Further alternatively, the headers 102 may be held apart by a restraining structure and the sheets 30 tensioned so that they stay apart without the aid of spacers. The sheets 30 may be tensioned, for example, by increasing the space between the headers 102 or by heat shrinking the sheets 30 between headers 102 spaced at a fixed distance.

The spacers 110 can be further provided with an abutment surface 124 to keep the base portions 112 of adjacent spacers 110 from contacting each other when assembled, or in other words, to maintain a gap 125 to accommodate the hollow fibers 32 extending between adjacent spacers 110 without being pinched or crushed flat. The spacers 110 can be constructed of an injection molded polymer material.

To install the spacers 110, the fingers 120 of one spacer 110 can be forced between the weaved hollow fibers 32 and inert fibers 34 of the sheet 30, and then into the recess 116 of an adjacent spacer 110 to snap the spacers together. When assembling the adjacent spacers 110, care should be taken to clear any hollow fibers 32 off of the abutment surface 124 before snapping the spacers 110 together. One or more hollow fibers 32 can be inserted in the recess 126 between the fingers 120 so that any hollow fibers 32 between the two fingers 120 will not pinched. Alternatively, the spacers 110 can be configured to connect to each other outside the edges 35 of the sheets 30.

The spacers 110 can be attached spaced in a row along the lower inert edges 35 of the sheets 30. By providing a row of spacers 110 adjacent the bottom of the sheets 30 in the module 100, the lower inert edges 35 of the sheets can be maintained in spaced apart relation, and upwardly directed currents in the tank water 14 may be sufficient to maintain the spacing and/or to control sludge build-up across adjacent sheets 30 upward of the lower edges 35. Maintaining a space between adjacent sheets 30 is useful as it inhibits the biofilm 20 of one sheet 30 from merging with the biofilm 20 of an adjacent sheet 30 and allows entry of air bubbles which can be used to remove excess biofilm 20.

The module 100 can have an additional row of spacers 110 along the upper inert edges 35 of the sheets 30. Spacers 110 can also be provided between the upper and lower inert edges 35 of the sheets 30. By aligning the spacers 110 in rows and columns, the spacers 110 can be provided in a grid pattern.

As an example, a module 100 having six sheets 30 pulled taut between the headers 102a and 102b was provided. Each sheet 30 had a length of 1-5 m (extending between the headers 102a and 102b) and a height of 0.5 m. Rows of spacers 110' were provided along the lower edge of the parallel sheets 30, at 20 cm intervals between the headers 102a and 102b. Each row of spacers 110' included five spacers 110', each of the five spacers 110' being positioned between two adjacent sheets 30. Each spacer 110' was 15 mm×15 mm×6 mm thick. The lower edges 35 of the sheets 30 were hemmed to prevent unraveling, and a rod 123 was pressed through the hemmed portion (and through the holes 121 in the spacers 110') and the ends of the rod 123 were bent over to secure the spacers 110' in position. Aeration was applied from below the module 100 at a rate of 0.8 SCFM, per foot of module length, with satisfactory results.

Referring now to FIG. 9, the spacing between the fibers 32 at the fiber ends potted in the header can be reduced. For example, the ends of the fibers 32 can converge towards a narrower header 102. This can reduce the size of the headers 102, which can improve circulation fluid flow characteristics in the tank 12 around the headers 102, and can reduce costs by, for example, reducing the volume of potting resin in the header 102. An offset block 108 can be provided adjacent one or both sides of the narrowed header 102 so that multiple modules 100 can be packed together in side-by-side arrangements (see also FIG. 15). The offset block 108 may connect to side plates 109 to keep tank water from reaching an area of un-spaced sheets 30.

Referring now to FIGS. 10 and 11, as an alternative to one or more of the rows of spacers 110, the module 100 can be provided with fluid permeable spacing strips 150. In the embodiment illustrated, the spacing strips 150 are provided adjacent the lower and upper inert edges of the sheets 30. Each spacing strip 150 comprises a length of a flow permeable spacing structure 154 extending between the headers 102. The spacing strips 150 have opposed ends 152 that are secured to the headers 102. The ends 152 can be potted in the headers 102.

The spacing strips 150 have sufficient compressive stiffness to maintain the desired spacing between adjacent sheets 30 in the module 100, yet are porous or otherwise minimally obstructing to tank water 14 circulating in the tank 12 in a generally upward direction, through the spacing strip 150, between adjacent sheets 30.

As best seen in an embodiment illustrated in FIG. 11, the flow-permeable spacing structure 154 can comprise a lattice arrangement of plastic segments 156 providing a generally hollow elongate structure with a rectangular cross-section. The spacing structure 154 may also be a rigid plastic mesh of a configuration and construction as used as a spacer for spiral wound reverse osmosis modules. In embodiment illustrated in FIG. 12, the flow-permeable spacing structure 154 of the spacing strip 150 comprises a length of plastic 158 having vertical through-holes 160 along its length. The spacing structure 150 can be formed of, for example, but not limited to, an injection-molded polymer. The spacing strips 150 can present side surfaces 151 to which the sheets 30 can be adhered.

Figure 13:
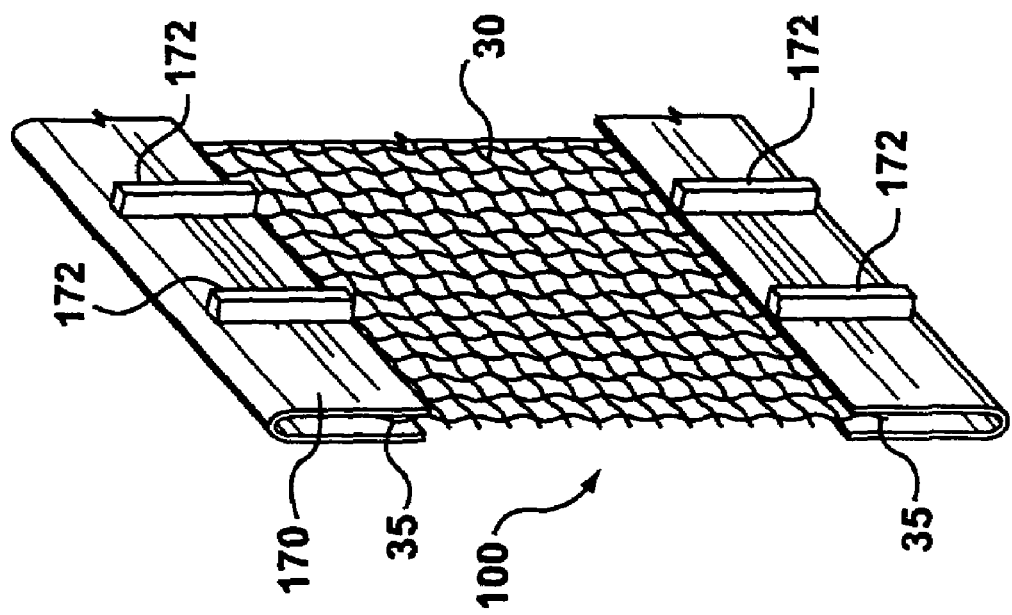
FIG. 13 is a perspective view of another alternative spacing structure for the module of FIG. 6.

Referring now to FIG. 13, another alternative spacing structure 170 can be provided for the module 100. The spacing structure 170 comprises a substantially rigid band folded over to form a thin clip that can be secured to the sheet 30 adjacent the inert edges 35. The spacing structure 170 can be provided with horizontally outwardly protruding ridges 172 extending from one or both sides of the structure 170, at discrete points along its length. The ridges 172 can abut the spacing structures 170 attached to adjacent sheets 30 in the module 100, so that the desired gap is maintained between the sheets 30. Circulation currents in the tank water 14 can flow between the ridges 172 and adjacent spacing structures 170.

Figure 14:
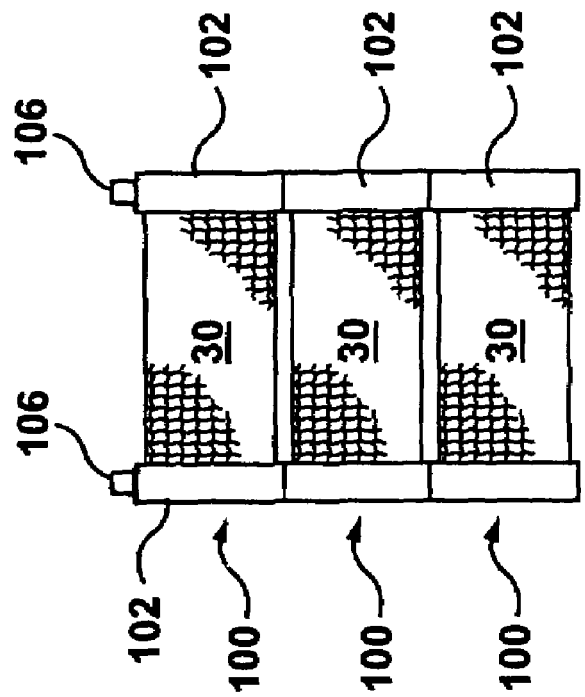
FIG. 14 is front view of a plurality of the modules of FIG. 6 shown in a vertically stacked arrangement.
Figure 15:
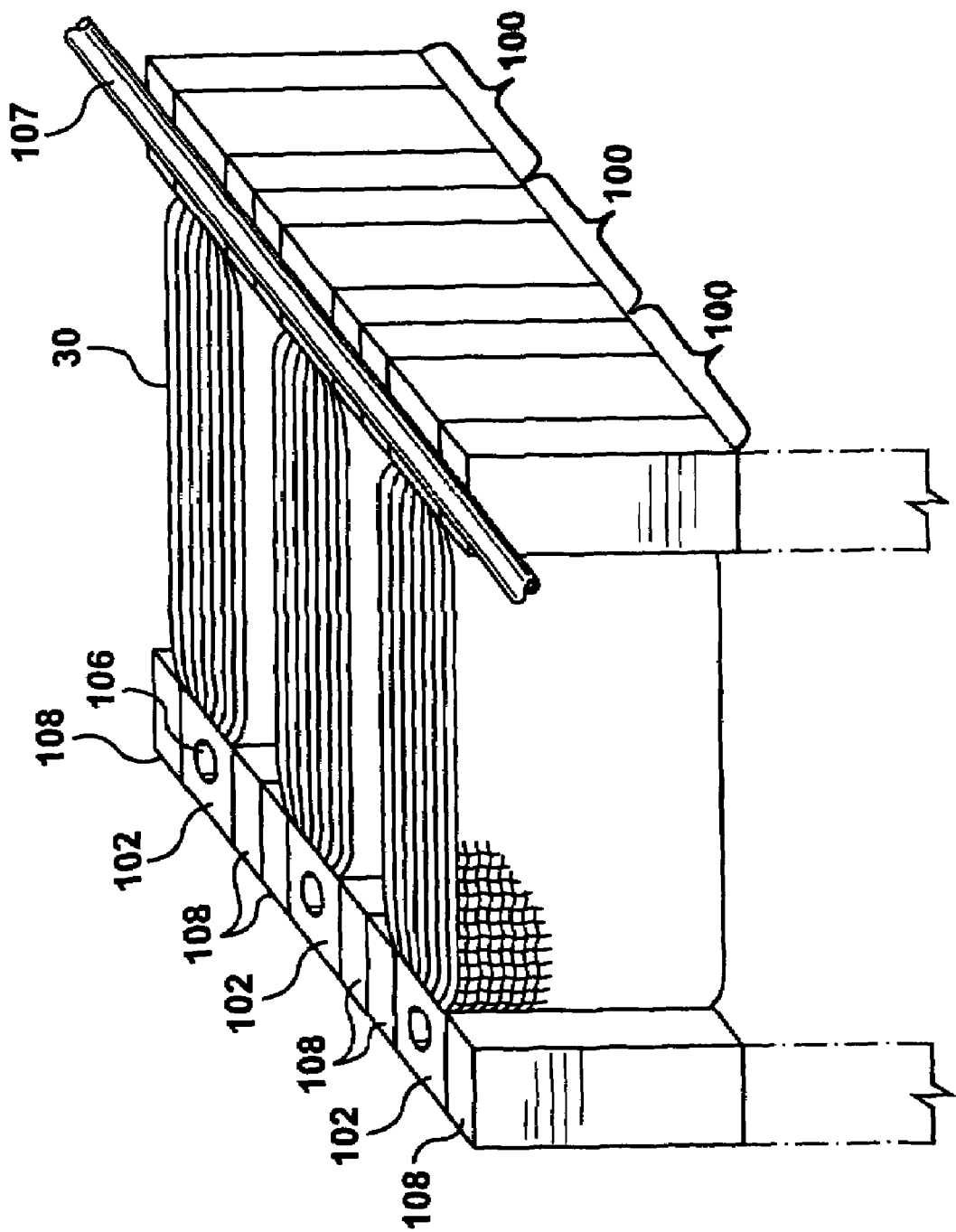
FIG. 15 is a perspective view of a plurality of the modules of FIG. 6 shown in a horizontally stacked arrangement.

Referring now to FIGS. 14 and 15, the modules 100 can be conveniently stacked vertically and/or horizontally (side-by-side) to provide a reactor cube or cluster that efficiently uses the available space in the tank 12. The headers 102 may be provided with snap-fitting male and female elements in the ports 106 so that vertically adjacent headers 102 are releasably attached to each other (FIG. 14). A duct 107 can extend across and be releasably attached to the upper ports 106 of a side-by-side stack of modules 100 (FIG. 15). The modules 100 may rest on blocks on the bottom of a tank 12. Solid plates (not shown), for example of PVC, may be placed between horizontally adjacent headers 102 and attached to at least one, and optionally both headers 102 of a module 100. The plates may be shared between and attached to each of a pair of adjacent headers 102 or attached only to one header 102. By any of these methods, modules 100 or sets of modules 100 attached to each may have their headers 102 spaced by the plates. The modules 100, or sets of modules 100, may be placed in an oven to shrink and tension the sheets 30 which may remove the need for spacers 110.

Figure 16:
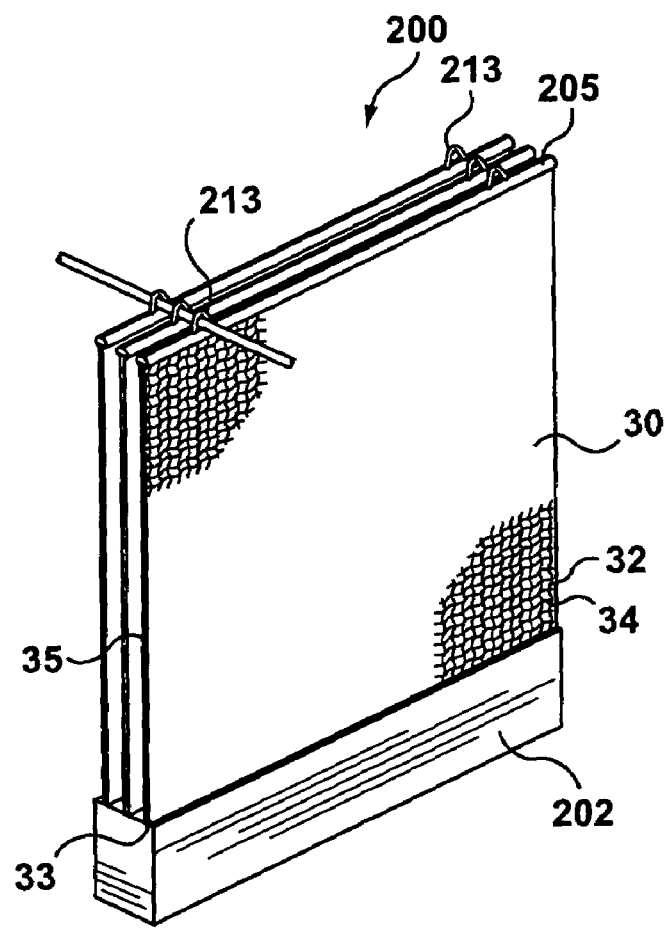
FIG. 16 is another embodiment of a membrane module for the apparatus of FIG. 1.

A second module embodiment is shown generally at 200 in FIG. 16. The module 200 has a single header 202 that may be oriented horizontally when installed in the tank 12.

Sheets 30 extend upwardly from the header 202, and the sheets 30 are oriented such that the hollow fibers 32 extend generally vertically and the inert fibers 34 extend generally horizontally. The lower active edges 33 of the sheets 30 are potted in the header 202.

In the embodiment illustrated, the upper active edges 33 of the sheets 30 extend above the surface of the tank water 14 in the tank 12, and are open to atmosphere. Alternately, the upper active edges 33 may be sealed shut to produce a dead end module. An optional cap 205 may be provided adjacent the upper ends of the hollow fibers 32 to protect the upper ends from intrusion of dirt or debris, and prevent the fabric sheet 30 from unraveling. The cap 205 can be buoyant to support the upper active edge 33 of the sheets 30 above the surface of the tank water 14. Alternatively, the upper edges 33 of the sheets 30 can be below the surface of the tank water 14 if the gas pressure in the lumens 38 is sufficient to prevent water intrusion.

Figure 17:
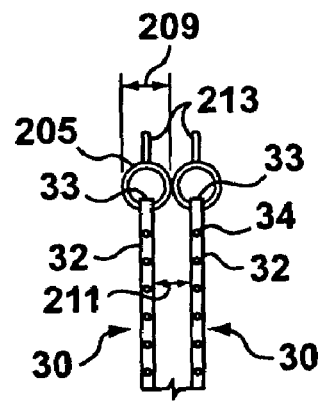
FIG. 17 is an enlarged side view of a portion of the module of FIG. 16.
Figure 18:
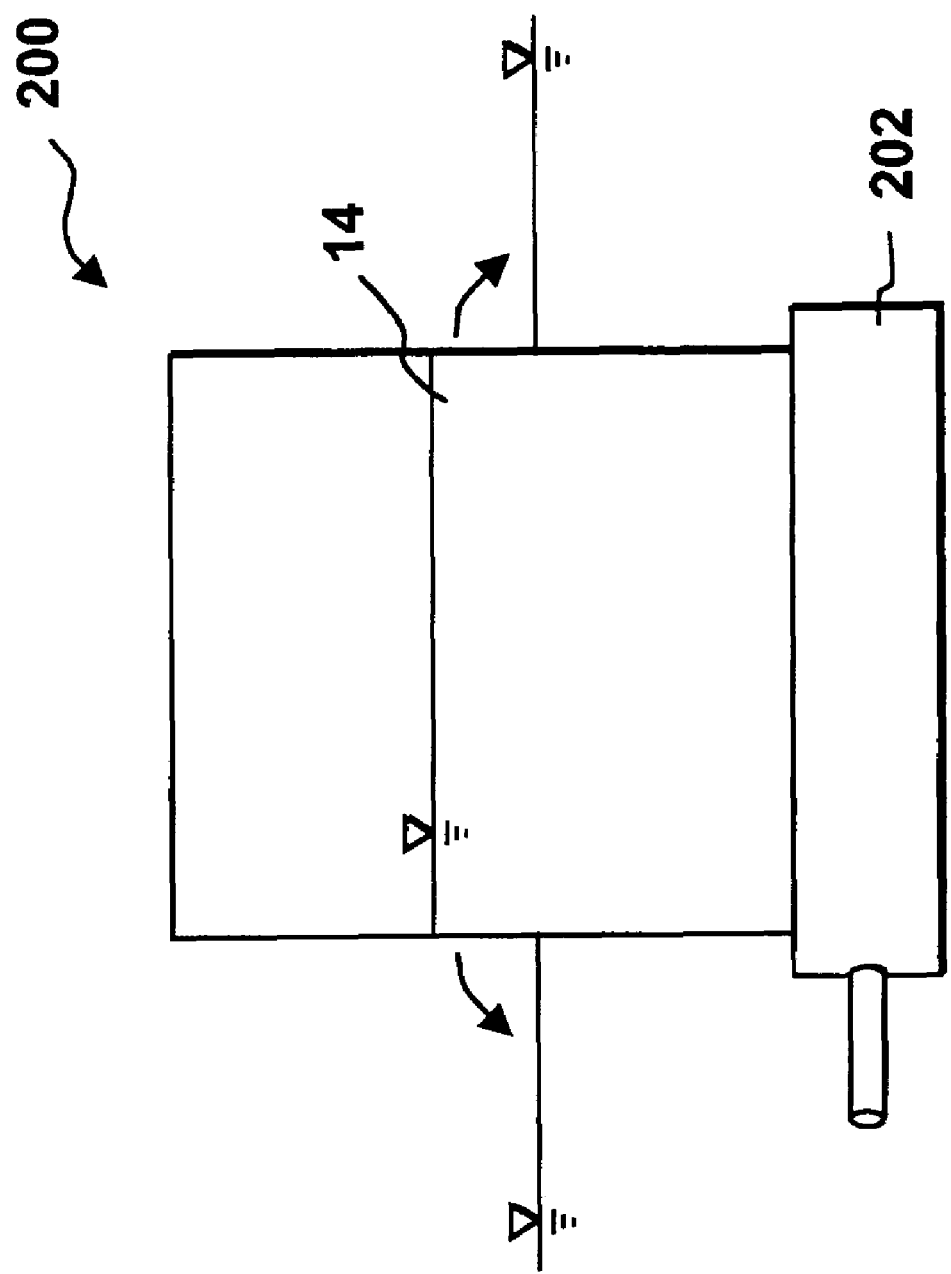
FIG. 18 is a schematic illustration of the module of FIG. 16 during a drain cycle.

As best seen in FIGS. 16 and 17, in the embodiment illustrated, the cap 205 is in the form of an elongate tubular member 207 that is clipped on to, and extends horizontally in use along, the upper active edges 33 of the sheets 30. The tubular member 207 has a width 209 (or diameter) such that the outer surfaces of caps 205 of adjacent sheets 30 abut each other and thereby assist in maintaining a desired gap 211 between adjacent sheets 30 in the module 200.

To facilitate holding the upper active edges 33 of the sheets 30 above the surface of the tank water 14, the module 200 can be provided with hooks 213 extending upwards from the upper edges 33 of the sheets 30. Suspending means 215, such as, for example, but not limited to, a cable or rod, can engage the hooks 213 to support the upper edges 33 of the sheets 30. The hooks 213 can extend from the caps 205.

Figure 19:
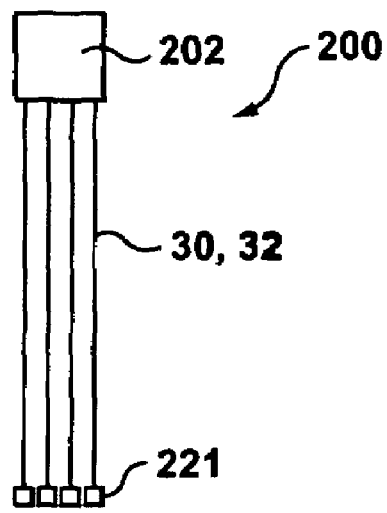
FIG. 19 is an alternate configuration of the membrane module of FIG. 16.

Referring now to FIG. 19, the single header module 200 can be configured to have the header 202 at the upper end of the sheets, with the sheets 30 extending vertically downward from the header 30 when installed in the tank 12. Weights 221 can be attached to the lower active edges 33 of the sheets 30 to maintain the vertical orientation of the hollow fibers 32. This may be particularly necessary where the sheets 30 are buoyant.

The lower edges 33 of the sheets 30 may be left open to release excess gas supplied to the fibers and/or to vent any gasses that may have diffused from the biomass 20 into the lumens 38. The tank water 14 adjacent the open ends may provide some back pressure to the gas in the hollow fibers 32 which may encourage greater transfer of oxygen through the membrane portions 17. Alternately, a single sheet header as shown for other embodiments may be used to collect gases at the lower end of the sheets 30 and connected to a tube to release those gases above the water surface.

As a further alternative, the module 200 can be provided with hollow fibers 32 oriented in a U-shaped configuration, such that the second end of the hollow fibers 32 are supported above the surface of the tank water, adjacent the header 202, and the central section of each fiber is secured to a lower portion of the tank 12, or weighted down.

Figure 20:
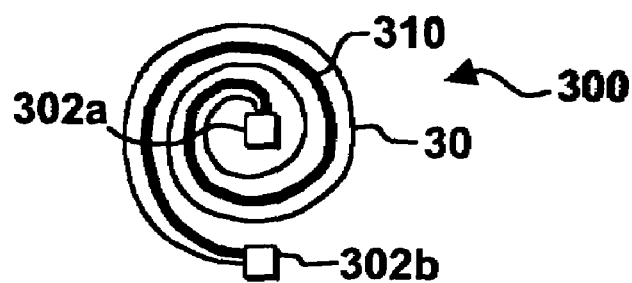
FIG. 20 is a top view another embodiment of a membrane module for the apparatus of FIG. 1, having a spiral configuration.
Figure 21:
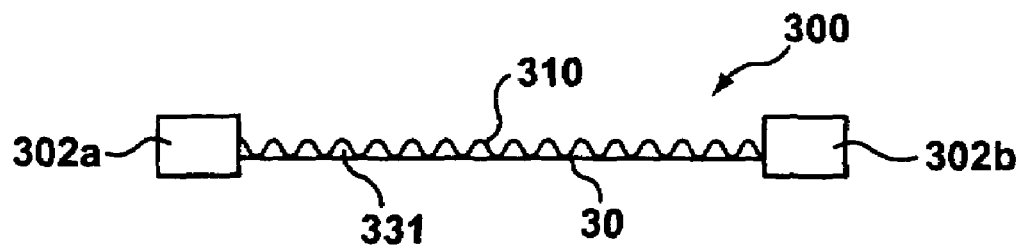
FIG. 21 is a top view of the module of FIG. 20 in an unwound state.

A third module embodiment 300, having sheets configured in a spiral arrangement, is shown in FIG. 20. The module 300 is formed of at least one sheet 30 having hollow fibers 32 extending between opposed headers 302a and 302b, and a spacing structure 310 provided adjacent the sheets 30 (FIG. 21). In the embodiment illustrated, the spacing structure 310 comprises a corrugated layer provided adjacent the sheet 30, providing vertical channels 331 through which tank water 14 can circulate when the module 300 is installed in the tank 12. Other spacing structures 310 may also be used, such as a rigid plastic mesh, for example, of the configuration and construction of spacers for spiral wound reverse osmosis modules. The corrugated layer 310 can be made of an extruded plastic.

Figure 22:
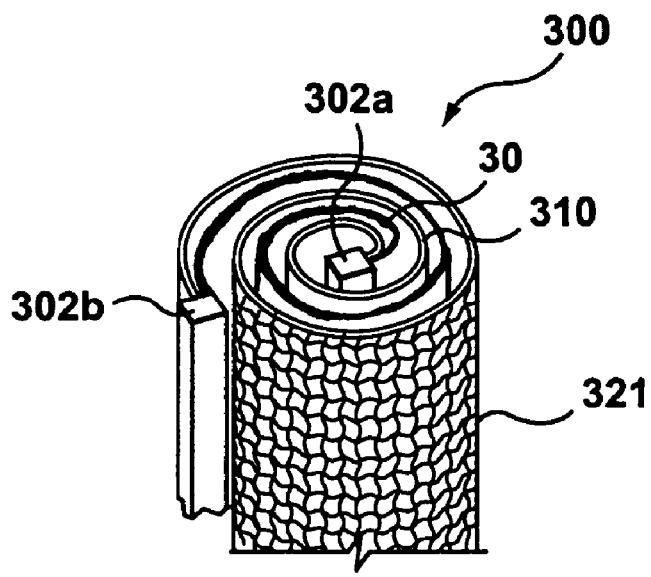
FIG. 22 is a perspective view of the module of FIG. 20.

Referring to FIGS. 20 and 22, the spiral configuration of the module 300 can be provided by winding one of the headers 302 with its attached one or more sheets 30 and corrugated layers 310 around the other header 302 in spirals of increasing radius. The wound bundle can be inserted into a generally cylindrical tank or cage 321 to hold the sheets/layers in the spiral configuration. The module 300 according to this configuration has one header (302a) extending generally along the axis of the spiral module 300, and the second header (302b) disposed adjacent the outer periphery of the spiral.

Figure 23:
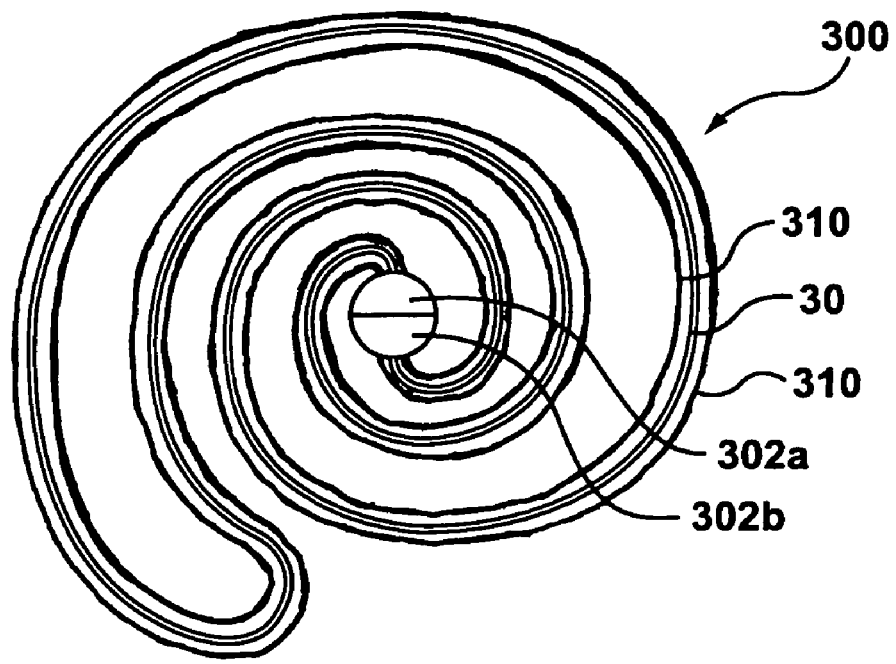
FIG. 23 is a top view of an alternate configuration of the module of FIG. 20, having adjacent central headers.
Figure 24:
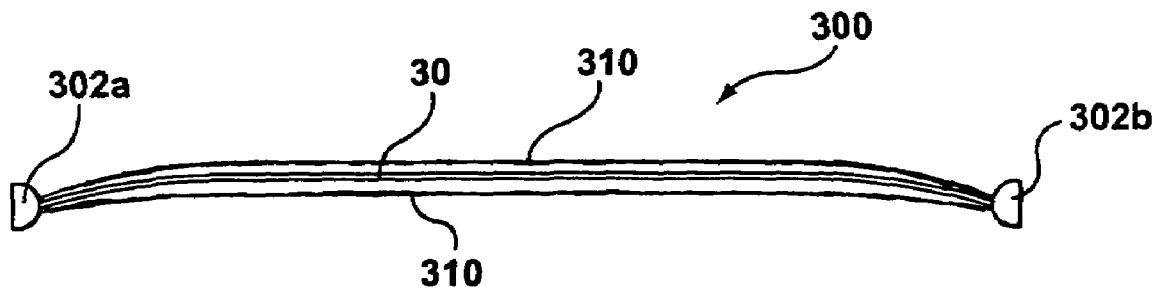
FIGS. 24 and 25 show the module of FIG. 23 in an unwound and folded state, respectively.
Figure 25:
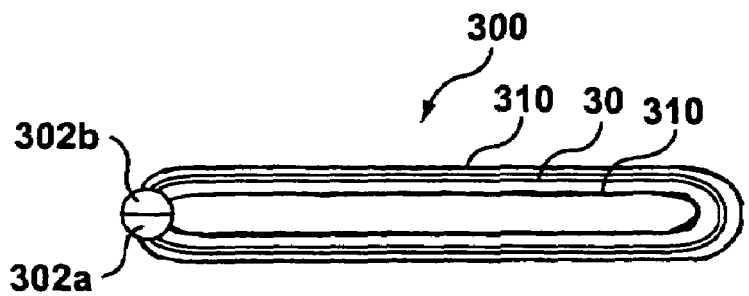

It can be advantageous (for piping and/or other reasons) to provide the delivery and exhaust headers 302a and 302b in closer proximity to one another. Such an arrangement is shown in the module 300 in FIG. 23, where the two headers 302a and 302b extend adjacent each other generally along the axis of the spiral module 300. This module can be formed by providing sheets 30 spacing structures 310 between the headers 302a and 302b (FIG. 24), and folding the sheet layers in half so that the headers 302a and 302b are adjacent each other (FIG. 25). The folded portion of the sheet is then wound around both headers 302a and 302b in spirals of increasing radius. In the embodiment illustrated, the module 300 has a single sheet 30 extending between the headers 302, sandwiched by a spacing structure (corrugated layer) 310 on either side. The corrugated layer 310 itself is only about the half the actual desired spacing width, since the layer 310 will generally be doubled (two layers 310 side-by-side) when the module 300 is configured in the spiral arrangement (FIG. 23).

The spacing structure 310 need not be in the form of a corrugated layer, but can take the form of, for example, but not limited to, sheets 30 having lateral protrusions extending from the surface of the sheets 30. The protrusions can be formed from the sheets 30 by pressing or embossing, or the protrusions can be separately attached buttons that are adhered to the surface of the sheets. As a further alternative spacing structure 310, the sheets 30 can be provided with a stiffness that can urge the sheets 30 to unwind from the confined spiral form. To obtain the desired stiffness, horizontal stiffener elements can be secured to the sheets 30. Alternatively, the hollow fibers can be constructed to have an inherent stiffness that may provide sufficient unwinding force without the addition of separate stiffener elements. As a result of the unwinding force, each spiral portion of the sheets 30 in the module 300 can space itself evenly apart from adjacent spiral portions, thus providing the desired gap.

Figure 26:
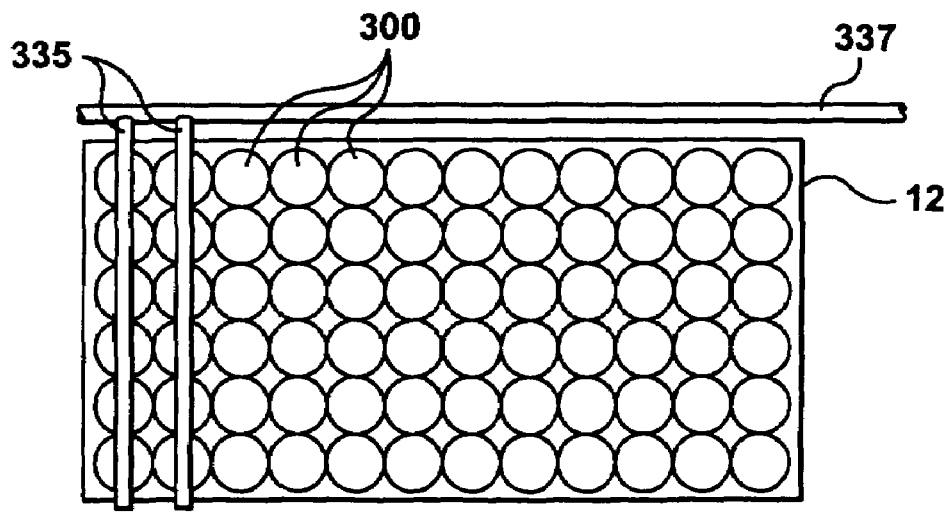
FIG. 26 shows modules according to FIG. 23 installed in a tank.

As best seen in FIG. 26, the modules 300 can be packed in the tank 12 to provide a reactor. The modules 300 can be packed in rows, and the upper ends of the delivery headers 302a in each row can be attached to a single channel gas delivery manifold 335, which can in turn be connected to a supply main 337. A module 300 may also be placed inside of a hollow pipe which functions as a container for a reactor.

The upper ends of the exhaust headers 302b can exhaust to atmosphere. Alternatively, the manifolds 335 can be dual channel manifolds having a delivery conduit 335a and an exhaust conduit 335b. The headers 302a and 302b can be connected to the conduits 335a and 335b, respectively.

Figure 27:
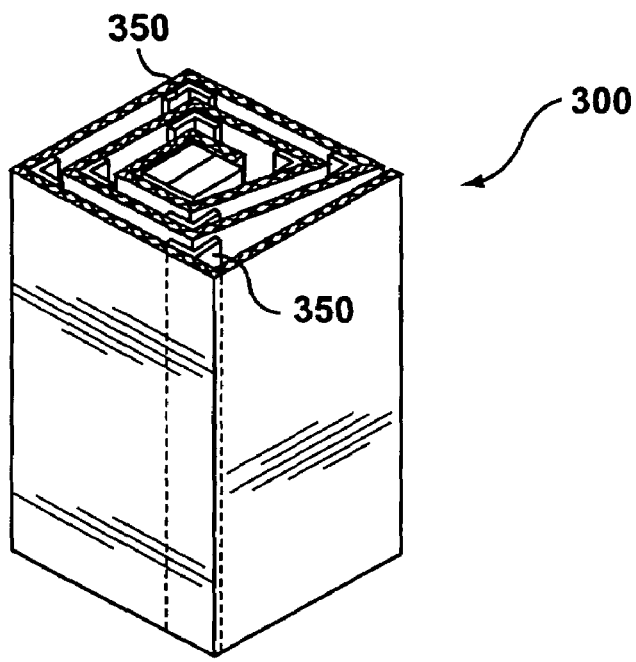
FIGS. 27, 28 and 29 shown an unfolded element, folded element and wound element respectively of a square spiral embodiment.
Figure 28:
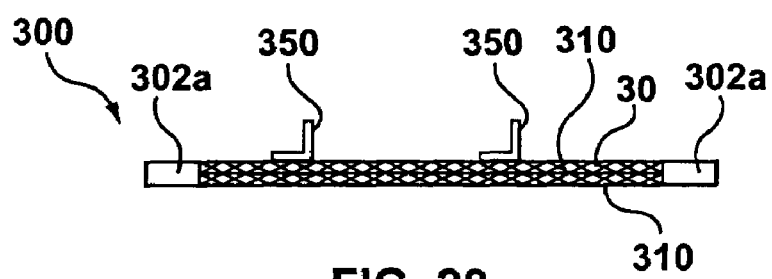
Figure 29:
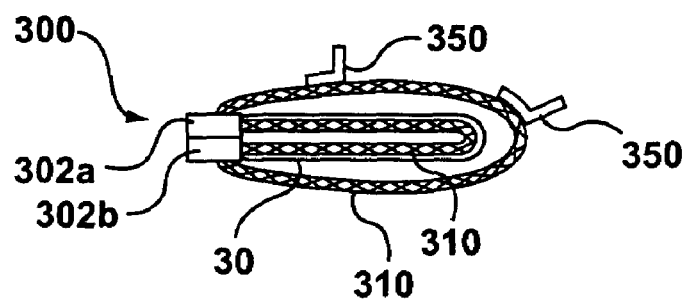

As best seen in FIG. 27, the sheets 30 (and layers 310 in the embodiment illustrated) of the modules 300 can be wound in a generally square spiral rather than a circular spiral to increase the packing density of the modules 300 in the tank 12. To facilitate forming a square spiral in the embodiment illustrated, corner elements 350 are provided along the length of the corrugated layer 310 on one side of the sheet 30, at selected locations along the length of the layer 310 (FIG. 29). The locations for the corner elements 350 are selected so that when the module 300 is folded over (FIG. 29) and wrapped into a spiral (FIG. 27), the corner elements 350 are aligned at desired corner locations of the spiral. The sheet 30 and layers 310 of the spiral module 300 can follow the contour of the corner elements 350 to assist in forming a square shaped spiral. The corner elements 350 can be formed of, for example, but not limited to, an extruded right angle bracket that extends the height of the module 300. Alternately, the corner elements 350 can be inserted as the sheets 30 are being wound.

Figure 30:
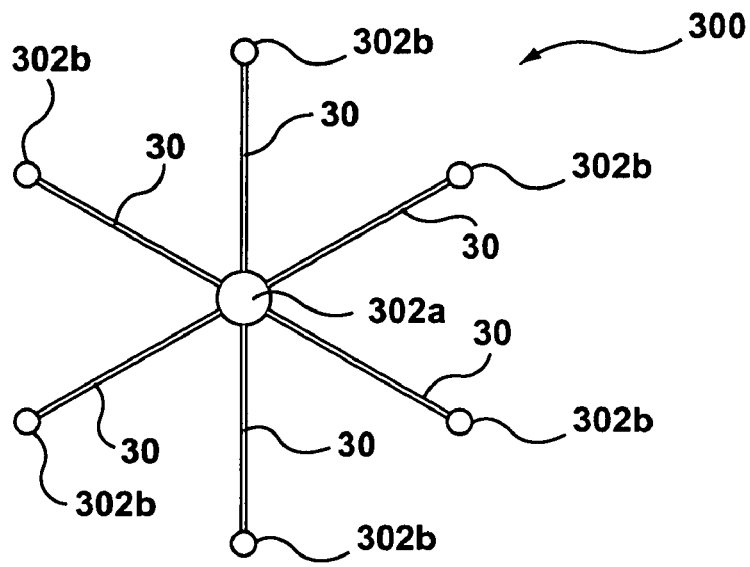
FIGS. 30, 31 and 32 show alternate embodiments of wound modules.
Figure 31:
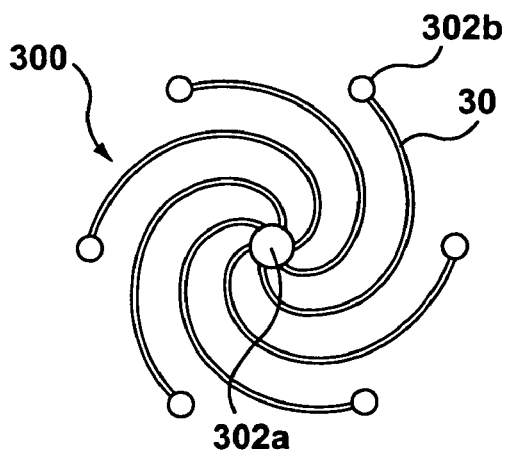

Alternate spiral designs for the module 300 are also possible. As an example, module 300 as illustrated in FIG. 30 has a single central gas delivery header 302a disposed as a hub with a plurality of sheets 30 and exhaust header 302b extending radially outwardly from the header 302a. The sheets 30 with exhaust headers 302b can be wound together around the header 302a to form a spiral configuration (FIG. 31). Any suitable spacing structure 310 (not illustrated) can be provided between the wound sheets 30 to provide a desired spacing between the sheets 30.

Figure 32:
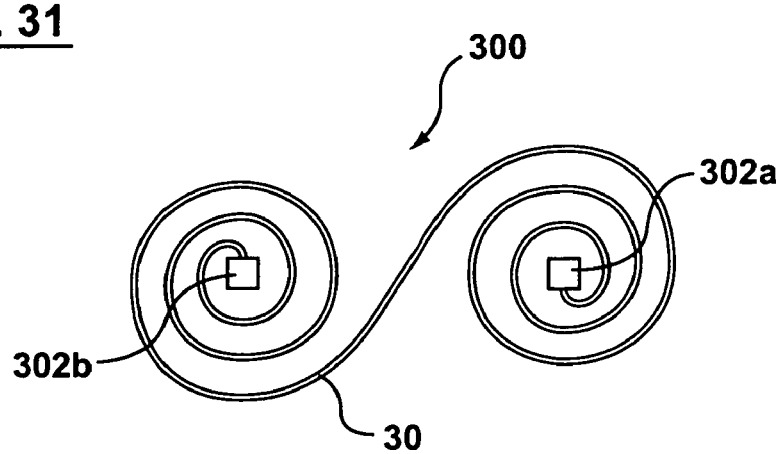

Another spiral configuration for the module 300, best seen in FIG. 32, has the sheet 30 extending between the headers 302a and 302b. A portion of the sheet 30 is wound around the header 302b, and another portion of the sheet 30 is wound around the header 302a, thereby forming a double spiral configuration.

Figure 33:
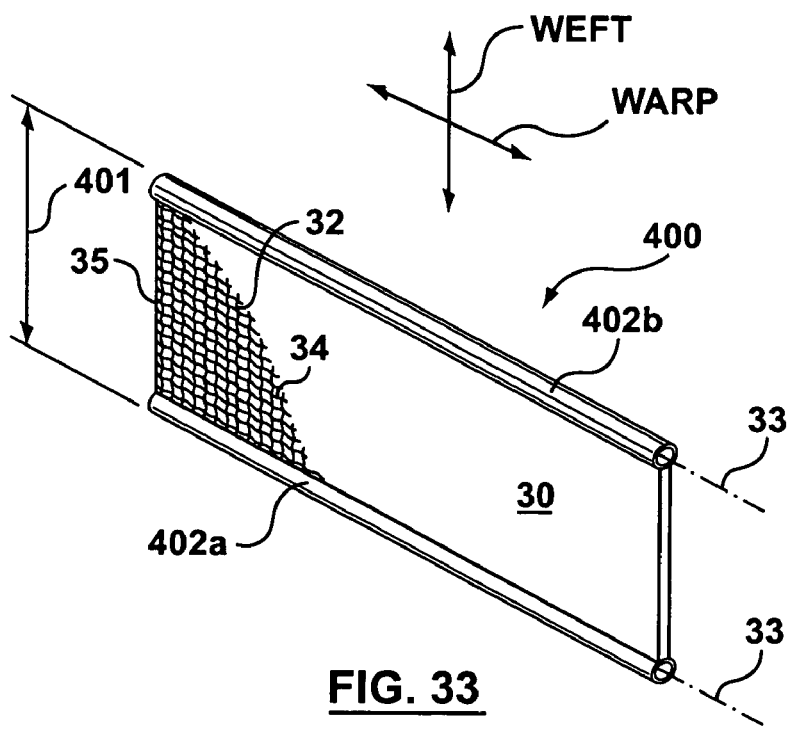
FIG. 33 shows a single sheet module.

Referring now to FIG. 33, another embodiment of a module 400 has a sheet 30 with a fixed width 401 and a continuous length extending transverse to the width 401. The hollow fibers 32 extend along the width 401 of the sheet 30, and are oriented in the weft direction. The inert fibers 34 are oriented in the warp direction. By being formed with a continuous length, the sheet 30 can be customized to have a length fit for any particular size of tank 12.

The module 400 has headers 402 in the form of ducts that extend continuously along the length of the sheet 30. More particularly, a gas delivery duct 402a and a gas exhaust duct 402b extend along opposite active edges 33 of the sheet 30. The headers or ducts 402 are also formed of a continuous length, and can be, for example, an extruded polymer material.

Figure 34:
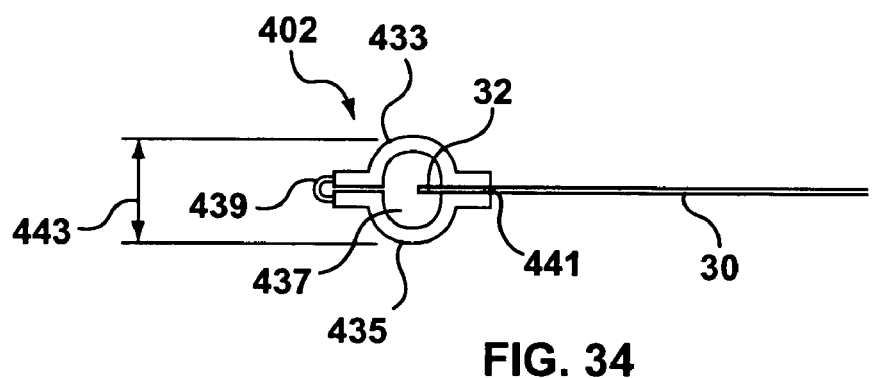
FIGS. 34 and 35 show a closed and unfolded view of a header on the module of FIG. 33 respectively.
Figure 35:
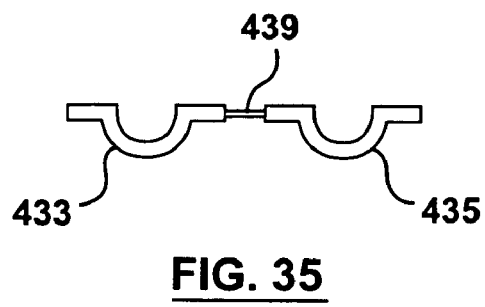

Further details of the ducts 402 can be seen in FIGS. 34 and 35. The duct 402 can be an extrusion having two concave shell portions 433 and 435, which can be positioned opposite each other to form a hollow interior cavity 437. The shells 433, 435 can be positioned along the active edge 33 of the sheet 30 so that the open ends of the hollow fibers 32 are inside the cavity 437. A sealant bead 441 can be applied between the edges of the shells 433, 435 adjacent the sheet 30 to seal the duct 402. The shells 433, 435 can also be sealed opposite the sheet 30, or that side can be provided with a hinge portion 439 so that the duct 402 has just the one seam along the sheet 30.

Figure 36:
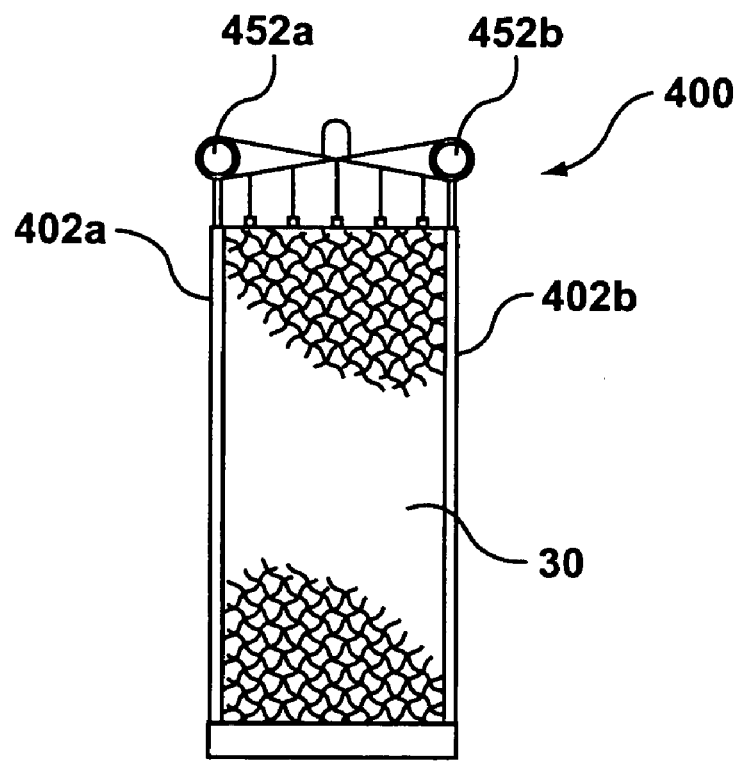
FIGS. 36 and 37 show elevation and plan views respectively of the module of FIG. 33 installed.
Figure 37:
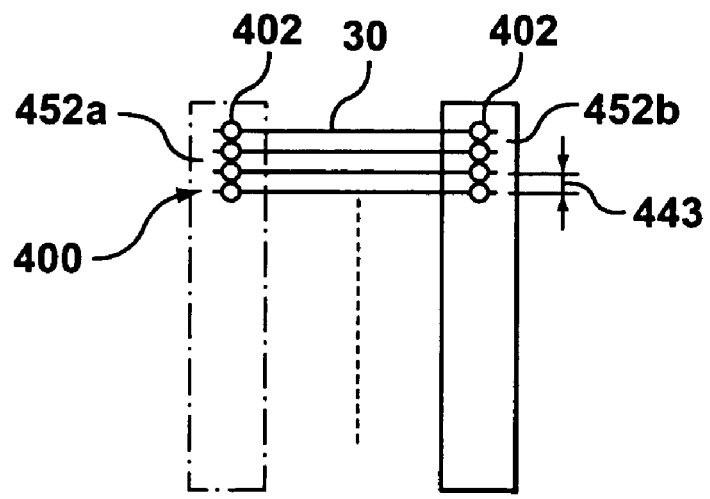

In use, the modules 400 are oriented in the tank 12 such that the ducts 402 are oriented vertically as shown in FIGS. 36 and 37. The length of the module 400 can conveniently be cut to fit the height of the tank 12. Multiple modules 400 can be arranged side-by-side within the tank 12, and the ducts 402 can have a width 443 such that the ducts 402 of adjacent modules 400 abut to maintain a desired gap between the sheets 30 (FIG. 37). Feed and exhaust mains 452a and 452b, respectively, can be provided for attachment to the headers 402a and 402b. The bottom of the sheet 30 may be weighted or otherwise biased towards or attached to the bottom of a tank 12. Lower ends of the ducts 402 are sealed closed.

Figure 38:
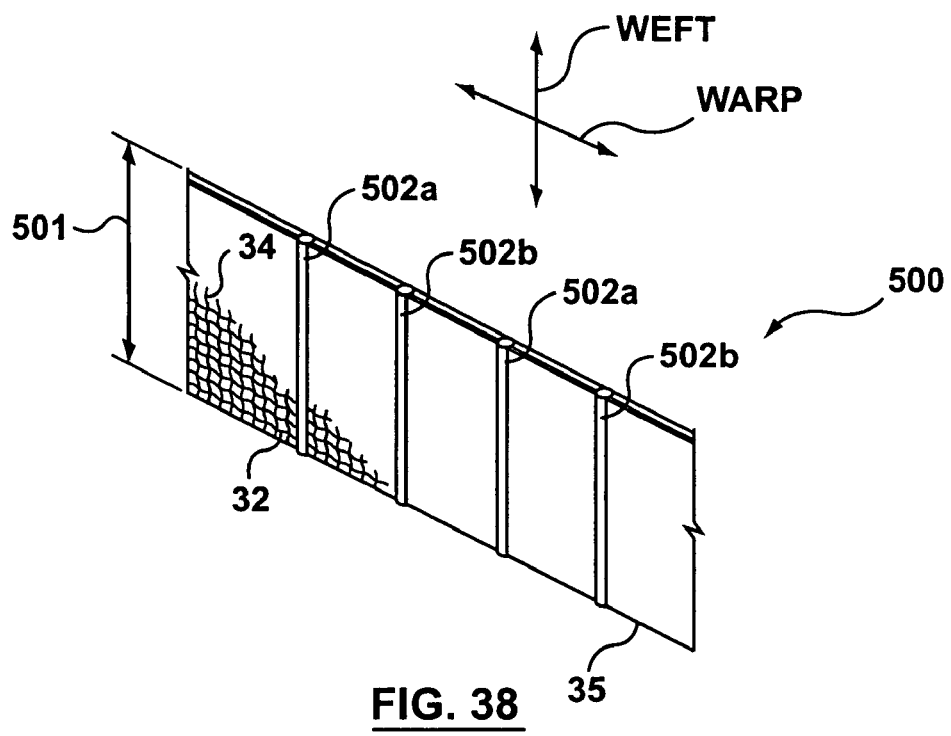
FIG. 38 shows an alternate embodiment of a single sheet module.

Referring now to FIG. 38, a modified module 500 is similar to module 400 but has the sheet 30 formed with the hollow fibers 32 extending along a continuous length in the warp direction. Gas delivery and exhaust headers 502a, 502b extend along the width 501 of the module 500, spaced apart from each other periodically along the length of the module 500. The distance between the headers 502a, 502b can be determined based on a number of process factors such as the pressure drop per unit length of hollow fiber 32. Lower ends of the headers 502 may be sealed. Upper ends of headers 502 may be connected to larger exhaust or inlet pipes. The module 500 may be folded in a Z-pattern such that feed headers 502a form a line and exhaust headers 502b form a second line to facilitate connection to larger feed or exhaust pipes.

Figure 39:
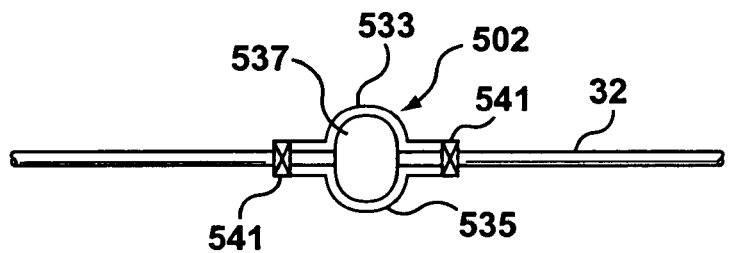
FIGS. 39 and 40 show details of the headers of the module of FIG. 38.
Figure 40:
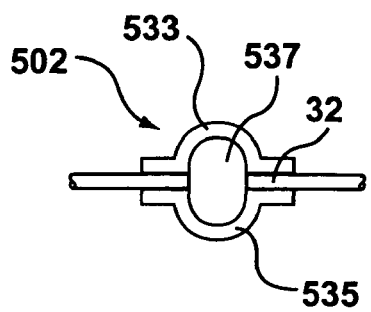

The headers 502 can be of two-piece construction having two concave shell portions 533 and 535 positioned opposite each other to form a hollow interior cavity 537. The shells 533, 535 are on opposite sides of the hollow fibers 32, which extend perpendicularly and continuously between the shells 533, 535 (FIG. 39). A sealant bead 541 can be applied between the edges of the shells 533, 535 adjacent the sheet 30 to seal the edges against the sheet 30. A hollow cylindrical punch can then be pressed through the length of the cavity 537 to cut open the ends of the hollow fibers 32 so that the hollow fibers 32 are in flow communication with the headers 502.

Figure 41:
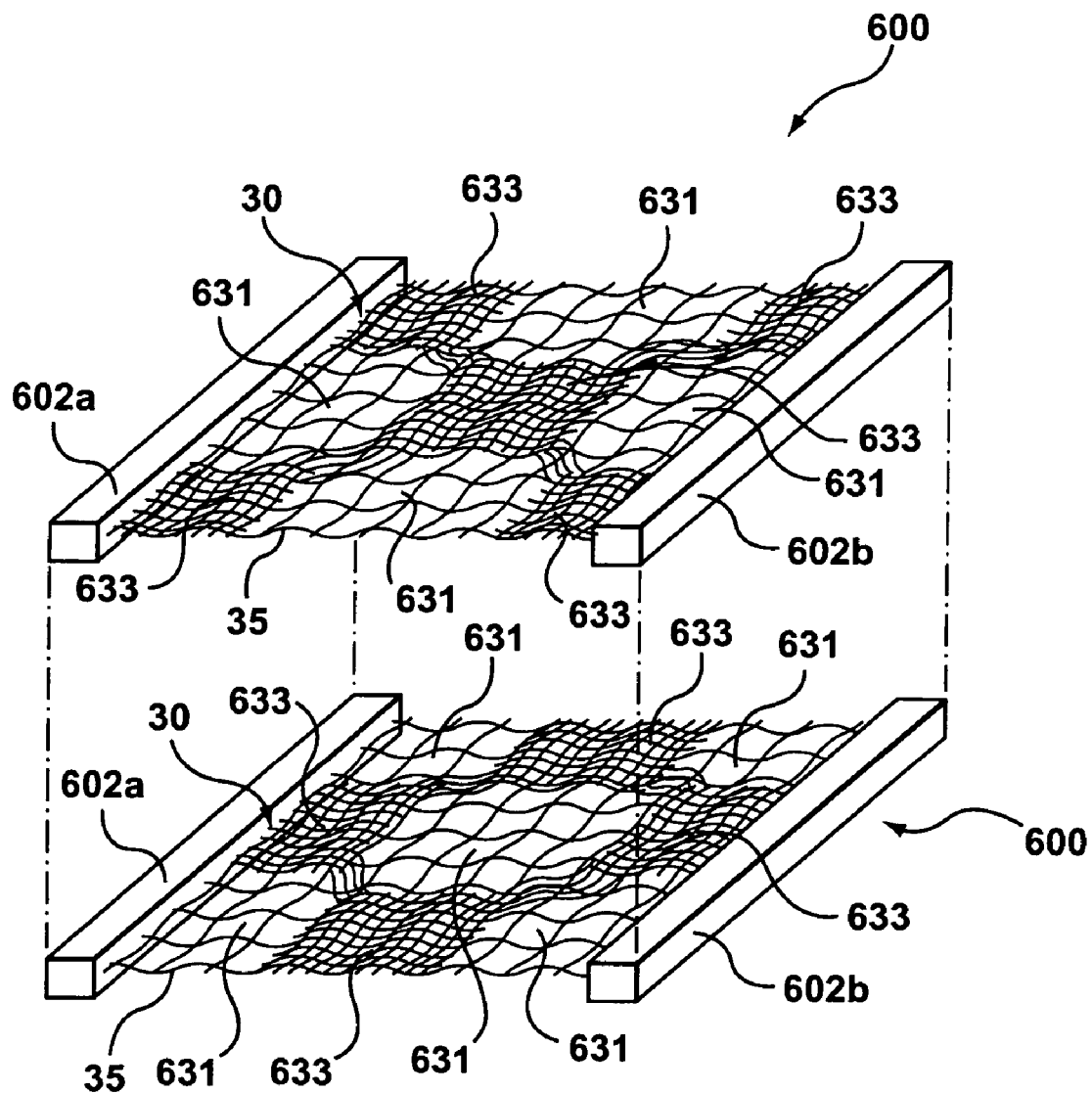
FIG. 41 shows an isometric view of an embodiment using a fabric having open portions.

Referring now to FIG. 41, another module embodiment 600 has sheets 30 with pattern weaving extending between headers 602. The pattern weaved sheets 30 have alternating loosely weaved zones 631 and tightly weaved zones 633. The modules 600 may be oriented flat (i.e. in a substantially horizontal plane) when installed in the tank 12. Multiple modules 600 can be stacked on top of each other to form a reactor cluster. Adjacent modules can have loose and tight weave zones 631, 633 in reverse locations so that the loose weave zones 631 in one module is sandwiched by tight weave zones 633 of adjacent modules. This arrangement can provide a sinuous flow path for circulation currents in the tank water 14. Alternatively, the loose and tight weave zones 631, 633 of adjacent modules 600 can be in vertical alignment so that the aligned loose weave zones 633 provide vertical flow paths that are generally straight. The sheets 30 of this embodiment may be closely spaced, for example less than 4 mm or less than 2 mm spacing, or be adjacent each other, or separated only by the potting materials. Other modules may have a larger spacing, for example between 2 mm and 20 mm or between 4 mm and 12 mm.

While preferred embodiments of the invention have been described herein in detail, it is to be understood that this description is by way of example only, and is not intended to be limiting. Other embodiments may be made or performed within the scope of the invention which is defined by the following claims.

We claim:

1. A membrane module apparatus to transfer a gas to or from another gas or a liquid, the apparatus comprising:
   a) a sheet having at least one gas transfer surface,
   b) a gas channel in flow communication with the gas transfer surface; and
   c) a header in flow communication with the gas channel, wherein the sheet is a textile sheet comprising hollow fibers.

2. The apparatus according to claim 1, wherein the walls of the hollow fibers comprise the gas transfer surface.

3. The apparatus according to claim 1, wherein the hollow fibers are constructed of a thermoplastic polymer.

4. The apparatus according to claim 1, wherein the sheet further comprises inert fibers.

5. The apparatus according to claim 4, wherein the hollow fibers and inert fibers are knitted, weaved, or stitched together to form the sheet.

6. The apparatus according to claim 1, comprising a gas delivery header and a gas exhaust header.

7. The apparatus according to claim 6, wherein the hollow fibers extend between and are in fluid communication with the gas delivery header and gas exhaust header.

8. A membrane module apparatus to transfer a gas to or from another gas or a liquid, the apparatus comprising:
   a) two headers and a plurality of generally parallel sheets extending between the two headers;
   b) each sheet having at least one gas transfer surface;
   c) a gas channel in flow communication with the at least one gas transfer surface, the headers in flow communication with the gas channel; and
   d) spacers between adjacent parallel sheets.

9. The apparatus according to claim 8 wherein the spacers comprise a spacer block positioned between adjacent sheets.

10. The apparatus according to claim 8 wherein the headers pull each sheet taut so that adjacent sheets remain spaced apart from each other.

* * * * *